United States Patent [19]

Jackson, Jr.

[11] 4,303,576

[45] Dec. 1, 1981

[54] STABILIZED POLYESTER COMPOSITIONS

[75] Inventor: Roy J. Jackson, Jr., Houston, Tex.

[73] Assignee: Shell Oil Company, Houston, Tex.

[21] Appl. No.: 164,208

[22] Filed: Jun. 30, 1980

[51] Int. Cl.$^3$ .............................................. C08K 5/18
[52] U.S. Cl. ................... 260/45.9 QB; 260/45.9 AA; 260/45.8 N; 260/45.8 NZ; 260/45.9 AD
[58] Field of Search ............... 526/193; 260/45.9 AA, 260/45.9 QB, 45.8 NZ, 45.8 N, 45.9 AD

[56] References Cited

U.S. PATENT DOCUMENTS

| | | | |
|---|---|---|---|
| 336,241 | 8/1885 | Shokal | 260/2 |
| 2,452,669 | 11/1948 | Levine | 260/45.9 AA |
| 2,633,458 | 3/1953 | Shokal | 260/45.2 |
| 2,646,416 | 7/1953 | Parker | 260/45.9 QB |
| 2,658,885 | 10/1953 | D'Alelio | 260/53 |
| 3,288,735 | 11/1966 | Watanabe et al. | 260/45.9 QB |
| 3,408,422 | 10/1968 | May | 260/837 |
| 3,432,478 | 3/1969 | May | 526/193 |

OTHER PUBLICATIONS

European Rubber Journal-Feb. 1974, vol. 156, No. 2, pp. 17 to 18.

*Primary Examiner*—V. P. Hoke
*Attorney, Agent, or Firm*—Norris E. Faringer

[57] ABSTRACT

Stabilized polyester compositions comprise (1) an ethylenically unsaturated polyester prepared by esterifying a polyepoxide with an ethylenically unsaturated monocarboxylic acid (e.g., acrylic or methacrylic acid) in the presence of an organic phosphine catalyst (e.g., triphenylphosphine), (2) a primary or secondary amine (e.g., p,p'-dioctyldiphenylamine) and, optionally, (3) a compatible ethylenically unsaturated monomer (e.g., styrene).

7 Claims, No Drawings

STABILIZED POLYESTER COMPOSITIONS

BACKGROUND OF THE INVENTION

Unsaturated polyesters derived from the esterification of polyepoxides with ethylenically unsaturated carboxylic acids are known. See, for example, U.S. Pat. No. 3,408,422. These polyesters, and particularly when combined with unsaturated monomers such as styrene, have limited shelf life, i.e., after storage at room temperature for some time they undergo premature gelation to form products having little or no utility. Efforts have been made to prevent the gelation both during the esterification step and during storage of the polyester product, by the addition of known stabilizing materials, but the results have not been too satisfactory. In many cases, the stabilizing materials have added undesirable color to the product and/or have interfered with the cure of the polyester. It would be very desirable to have a stabilizing material which would not affect color, would not interfere with the cure and could be employed in small amounts. A very good stabilizer includes the dialkylhydroxylamines disclosed in U.S. Pat. No. 3,408,422. It will be appreciated that the catalysts employed in U.S. Pat. No. 3,408,422 are the onium salts, which are believed to be excellent esterification catalysts; however, when an organic phosphine is utilized as the esterification catalyst, the resulting polyesters are not as stable as desired for some applications. In other words, when an organic phosphine is used as an esterification catalyst, particularly if the resulting polyester is modified by further reaction with a dicarboxylic acid anhydride, the polyester composition tends toward premature gelation. It would therefore be highly desirable to improve the stability of the phosphine-catalyzed polyester processes and the resulting polyester compositions.

SUMMARY OF THE INVENTION

The present invention provides an improved process for preparing stabilized polyester compositions and to the stabilized polyester composition. Simply, the stabilized compositions comprise: (1) an ethylenically unsaturated polyester prepared by esterifying a polyepoxide with an ethylenically unsaturated carboxylic acid in the presence of an organic phosphine catalyst, (2) a primary or secondary amine, and, (3) optionally, a compatible ethylenically unsaturated monomer.

DESCRIPTION OF THE PREFERRED EMBODIMENTS

The present invention is particularly directed to the stabilization of vinyl esters prepared by reacting a polyepoxide with an ethylenically unsaturated carboxylic acid in the presence of an organic phosphine esterification catalyst. These hydroxy-substituted ethylenically unsaturated polyesters (vinyl esters) may be further modified by subsequent reaction of at least a portion of the pendant hydroxyl groups with an acid anhydride, preferably maleic anhydride. The resulting polyesters and/or modified polyesters are then preferably admixed with at least one unsaturated monomer, such as styrene, and the polyester and/or polyester/styrene composition stabilized by the addition of at least one primary or secondary amine.

As noted, a particularly preferred group of polyesters for use in the present stabilized compositions comprise the hydroxy-substituted ethylenically unsaturated polyesters obtained by the esterification of polyepoxides with ethylenically unsaturated carboxylic acids.

The polyepoxides used in the process of the invention comprise those compounds possessing more than one vic-epoxy group, i.e., more than one

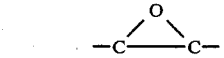

group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides that may be used in the process of the invention are given in U.S. Pat. No. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

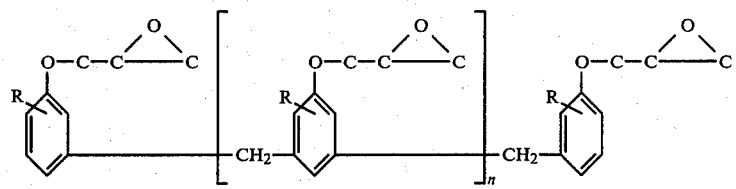

wherein R hydrogen or an alkyl radical and n is an integer of 1 to about 10. Preparation of these polyepoxides is illustrated in U.S. Pat. No. 2,658,885.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trinalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241, are suitable for use in the present compositions. Accordingly, the relevant disclosures of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

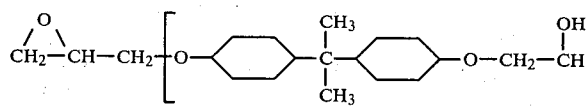 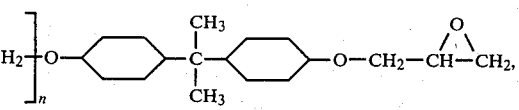

wherein n has a value so that the average molecular weight of the saturated polyepoxide is from about 350 to 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-hydroxyphenyl)propane.

Still other polyepoxides are disclosed in U.S. Pat. No. 3,408,422, and the disclosure relevant to polyepoxides is incorporated herein by reference.

The other component in the reaction comprises an ethylenically unsaturated organic carboxylic acid which may be aliphatic, cycloaliphatic, or aromatic, and may be monocarboxylic or polycarboxylic. Examples of the acids to be utilized include acrylic acid, methacrylic acid, cyclohexane carboxylic acid, maleic acid, crotonic acid, alpha-phenylacrylic acid, tetrahydrophthalic acid, 2,4-octadienedicarboxylic acid, dodecadienoic acid and the like, and corresponding anhydrides.

Particularly preferred acids to be utilized comprise the ethylenically unsaturated acids such as, for example, acrylic acid, methacrylic acid, crotonic acid, alpha-phenyl-acrylic acid, alpha-cyclohexylacrylic acid, maleic acid, alpha-chloromaleic acid, tetrahydrophthalic acid, itaconic acid, fumaric acid, cyanoacrylic acid, methoxyacrylic acid, and the like, the the anhydrides thereof.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen phthalate, allyl hydrogen succinate, allyl hydrogen fumarate, butenyl hydrogen tetrahydrophthalate, and the like, and mixtures thereof.

Coming under special consideration, particularly because of the superior coating properties of the resulting unsaturated polyesters, are the ethylenically unsaturated monocarboxylic acids and unsaturated partial esters, and especially the unsaturated aliphatic monocarboxylic acids containing 3 to 10 carbon atoms, and the alkenyl and alkyl esters of alkenedioic acids containing up to 12 carbon atoms.

The catalyst utilized in the esterification step comprises the organic phosphines of the general formula:

$$P(R)_3$$

wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibuty allyl phosphine and the like, and mixtures thereof.

Particularly preferred phosphines to be employed included the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

The amount of the above-noted polyepoxide and acid to be used in the reaction may vary over a wide range. In general, these reactants are used in approximately chemically equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of carboxylic acid per equivalent of epoxide.

The amount of the catalyst employed may also vary over a considerable range. In general, the amount of the catalyst will vary from about 0.5% to about 3% by weight and more preferably from 0.1% to 2% by weight of the reactants.

The reaction may be conducted in the presence or absence of solvents or diluents. In most cases, the reactants will be liquid and the reaction may be easily effected without the addition of solvents and diluents. However, in some cases, whether either or both reactants are solids or viscous liquids it may be desirable to add diluents to assist in effecting the reaction. Examples of such materials include the inert liquids, such as ketones, inert hydrocarbons as xylene, toluent, cyclohexane and the like.

If solvents are employed in the reaction and the resulting product is to be used for coating purposes, the solvent may be retained in the reaction mixture. Otherwise, the solvent can be removed by any suitable method as such by distillation and the like. If the product is not to be used for some time after its formulation, it may also be desirable to remove the catalyst used in the preparation, such as by stripping, neutralization and the like.

Temperatures employed in the reaction will generally vary from about 50° C. to about 150° C. In most cases, the reactants will combine in the presence of the catalyst at a vary rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.20 eq./100 g. or below.

The process of the invention may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the necessary components, such as solvents, catalyst, excess reactants and the like.

The polyester products obtained by the above process will vary from liquids to solid resins. The products will possess a plurality of free OH groups and a plurality of ethylenic groups. The products will be of higher molecular weight then the basic polyepoxide from which they are formed and will possess at least more than one ester group per polyepoxide unit.

As noted hereinbefore, these hydroxyl-containing polyesters may be further modified by reacting a portion of the free pendant hydroxyl groups with a polycarboxylic acid anhydride to produce half esters (or partial half esters).

Suitable anhydrides include, among others, maleic acid anhydride, chloromaleic acid anhydride, dichloromaleic anhydride, 1,2-cyclohexenedicarboxylic acid anhydride, vinylcyclohexane-dicarboxylic acid anhydride, phthalic anhydride, nadic anhydride, the tetrahalophthalic anhydride and the like, and mixtures thereof. The preferred anhydrides to be used are the ethylenically unsaturated polycarboxylic acid anhydrides containing from 4 to 18 carbon atoms.

The amount of the anhydride employed in the reaction should be sufficient to effect a formation of a half ester at each of the OH groups to be esterified. There should thus be approximately one mole of the anhydride for each OH on the polyester molecular to be esterified. In some cases, it may be desired to effect a 100% esterification of the free OH groups on the polyester molecule, while in other cases only partial esterification, such as from 5% to 60% of the OH groups. For many applications, such as in the formation of laminated products it is generally desirable to effect only a say 5%, 10%, 20% or 40% esterification of the OH groups. Thus, for a 50% esterification of the two OH groups present on the polyester noted above with maleic anhydride, one would react one mole of the polyester with approximately one mole of the maleic anhydride.

The reaction between the polyester and the anhydride can be accomplished by merely mixing and reacting the components together in a suitable reaction vessel in the absence of water. The reaction may be accomplished in the presence or absence of solvents or diluents. Suitable solvents include the inert hydrocarbons, such as cyclohexane, benzene, toluene and the like.

The reaction is accomplished in the absence of water and by using dry reactants and reaction vessels.

The reaction may be accomplished over a wide range of temperatures. In most cases, the reaction will take place at room temperature and is preferably conducted at or near room temperature. The reaction, however, can be speeded by the application of heat. In such a case, preferred temperatures ranges from bout 25° C. to about 125° C.

The half ester modified products prepared by the above process will vary from thick liquids to solid product. They will possess a plurality of free carboxyl groups and increased unsaturation. The products will be soluble in solvents, such as benzene, acetone and the like and can be converted on application of heat and catalysts as noted below to hard insoluble, infusible products.

In case products of higher viscosity are needed, the partial half esters may be thickened by refluxing in an inert solvent while removing water formed as a result of the reaction of the free carboxyl groups with the remaining hydroxyl groups on the polyester.

Preferred partial esters have the following general formula:

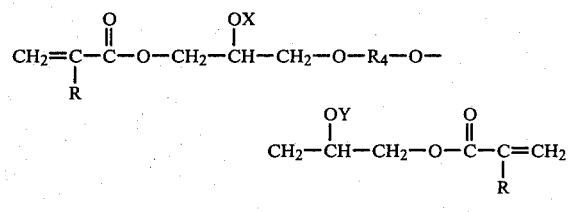

wherein R is a hydrogen or an alkyl radical preferably from 1 to 5 carbon atoms, $R_1$ is a residue of a polyhydric phenol by removing the two OH groups and X and Y are each hydrogen or a

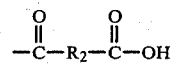

wherein R is hydrogen or an unsaturated alkylene radical, preferably from 2 to 16 carbon atoms. Very preferred half esters comprise the partial half esters thereof, i.e., the preferred partial half esters comprise those half esters of the above formula wherein, on the average, the total of X+Y comprise from about 5% to 95% hydrogen atoms and from about 5% to 95%

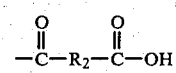

radicals. In other words, from 5% to 95% of the hydroxyl groups are esterified. As noted hereinbefore, however, for some applications, it may desirable to effect a 100% esterification wherein X and Y are each

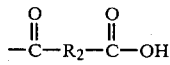

For many of these applications, the unsaturated polyesters are used in admixture with unsaturated monomers, and preferably liquid to solid resins. The products will possess a plurality of free OH groups and a plurality of ethylenic groups. The products will be of higher molecular weight than the basic polyepoxide from which they are formed and will possess at least one more than one ester group per polepoxide unit.

For many of these applications, the unsaturated polyesters are used in admixture with unsaturated monomers, and preferably liquid monomers possessing at least one $CH_2=C$ group, such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acids, butenoic acid, allyl-benzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mitures thereof. These are preferably used in amounts varying from about 0.5% to 90% by weight of the mixture, and preferably 5% to 55% by weight of the mixture.

The stabilizing material to be added to the above-described polyesters and polyester blends include the primary and secondary amines.

Suitable primary amines have the general formula:

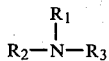

wherein $R_1$, $R_2$ and $R_3$ each represent the same or different hydrocarbon radicals which may be alkyl, cycloalkyl, alkanol, alkenyl, aryl, alkaryl, and the like. Examples of primary amines include, among others, diethylene triamine (DETA), diethylamino propylamine (DEAPA), ethylene diamine, triethylene tetramine, dimethylamino propylamine, diethylamino propylamine, metaphenylene diamene, 4,4'-methylene dianiline, 2,6-diaminopyridine, 4-chloro-ortho-phenylamine dramine, diamino diphenyl sulfone.

Suitable secondary amines include the amines of the general formula:

wherein $R_1$ and $R_2$ may be the same or different hydrocarbon radicals; such as, for example, alkyl, alkanol, alkenyl, cycloalkyl, aryl, alkaryl, and the like.

Examples of suitable secondary amines include, among others, N-methylethanolamine, diethanolamine, dimethylamine, diethylamine, dipropylamine, dimethanolamine, dipropanolamine, diphenylamine, dibenzylamine, morpholine, piperidine, and the like.

A very suitable secondary amine has the general formula:

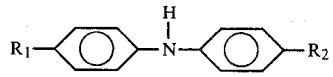

wherein $R_1$ and $R_2$ are the same or different hydrocarbon radicals, preferably alkyl radicals, and more preferably alkyl radicals of up to about 12 carbon atoms, or hydrogen. A very suitable such secondary amine is p,p'-dioctyldiphenylamine.

The amount of amine stabilizer to be employed will vary over a considerable range depending upon the particular polyester, amount of esterification catalyst employed, particularly amine selected as well as the desired shelf life and the like. In general, the amount of amine stabilizer may vary from as little as 0.0001% to as high as 10% or higher by weight of the material to be stabilized. Preferred amounts of amine stabilizer may vary from about 0.005% to 0.5% by weight.

The stabilization may be accomplished by simply mixing the amine stabilizer directly with the unsaturated polyester of polyester blend or may be in admixture with other resinous materials. Although it is preferred to add the stabilizer to the polyester composition, the addition can be added during the esterification. The stabilizer may be added as such or in the form of a solvent solution or in combination with other materials.

After combination components should be thoroughly mixed as by stirring, blending and the like.

Modifying agents such as plasticizers, pigments, and fillers may be added to the material to be stabilized before, at the same time as or after the addition of the hydroxylamine.

The compositions of the present invention are characterized by their improved storage stability, i.e., improved resistance to premature gelation when exposed to storage temperatures say from 10° C. to about 30° C. The length of the stabilization will vary with the temperature as shown in the working examples at the end of the specification. At storage temperatures of 10° C. or below the compositions have indefinite stability.

The stabilized polyester compositions can be used for a variety of applications. Those compositions containing the polyesters by themselves as well as those extended with unsaturated monomers such as styrene and the like can be easily polymerized at elevated temperatures to form valuable plastic products.

The process of the invention may be used to stabilize the unsaturated esters by themselves or as mixtures of the esters with any of the above-described extenders. As the stabilization problem is particularly acute with the compositions containing the vinyl monomers, these are the preferred materials to be used in the process. When the polyester is used in combination with the above components, such as styrene, the amount of the other component may vary over a wide range, but is generally preferred to have at least 5% by weight of the polyester present. In working with components, such as the unsaturated monomers as styrene, it is preferred to utilize from 1% to about 65% of the dissimilar monomer and from 99% to 35% of the new hydroxy-substituted polyester.

The polymerization of the above-noted polyesters or mixtures with monomers may be accomplished by any suitable method. The preferred method comprises heating the polyester or its mixture with monomers in the presence of a free radical yielding catalyst. Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobiisobutyrate, 2,2'-azobis(2,4-dimethylvaleronitrile, 2,2'-azobiisotulyamide), and the like. Particularly preferred catalysts include the diatoyl peroxide, tertiary alkyl hydroperoxides, alkyl peresters of carboxylic acids and particularly those of the above-noted groups which contain no more than 18 carbon atoms per molecule and have a decomposition temperature below 150° C.

Other materials may also be added to the mixtures before or during polymerization. This includes plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalysts selected. In general, polymerization temperatures may vary from about 20° C. to about 200° C. and more preferably from 20° C. to 175° C.

The unsaturated polyesters and their above-noted mixtures with other monomers may be utilized in a wide variety of different applications. They may be utilized in the preparation of coatings and impregnating compositions, in the preparation of adhesives for metals, wood, cement and the like, and in the preparation of reinforced composite proucts, such as laminated products, filament windings and the like. In this latter application, the polyester compositions are applied to the fibrous products, such as glass fibers or sheets, the material formed into the desired object and heated to effect cure of the polyester composition.

The following examples are given to illustrate the process of the invention. It should be understood that the examples are given for the purpose of illustration and the invention is not to be regarded as limited to any of the specific conditions recited therein. Unless otherwise indicated, parts in the examples are parts by weight.

Epoxy Resin A is a diglycidyl ether of 2,2-bis(4-hydroxyphenyl)propane having a weight per epoxy (WPE) of about 170–190 and an average molecular weight of about 350.

Epoxy Resin B is an epoxy resin having a WPE of about 515 and an average molecular weight of about 980 to 1050 prepared by reacting Epoxy Resin A with 2,2-bis(4-hydroxyphenyl)propane in the presence of tetramethyl ammonium chloride (TMAC).

Phenolic Novolac Resin A is a novolac resin having an average molecular weight of 520 and a phenolic functionality of about 5.

Saturated Resin A is a diglycidyl ether of hydrogenated 2,2-bis(4-hydroxyphenyl)propane having a WPE of about 200–240 and an average molecular weight of about 380.

EXAMPLE I

This example illustrates the effectiveness of the instant amine stabilizer or polyesters prepared in the presence of organic phosphine esterification catalysts.

Into a one-liter flask equipped with stirrer, thermometer, $N_2$ sparge tube and condenser were placed 265 grams of Epoxy Resin A, 79 grams of 2,2-bis(4-hydroxyphenyl)propane (BPA), and 0.275 grams of TMAC. The mixture was heated under nitrogen at 171° C. (340° F.) for one hour. The temperature was then lowered to 116° C. (240° F.) and 6.5 grams of glacial methacrylic acid, 86 grams of styrene, 2.62 grams of triphenylphosphine and 0.16 grams of hydroquinone were added and the temperature held at 116° C. (240° F.) for three hours. The temperature was then lowered to 93° C. (200° F.) and 258 grams of styrene was added and the mixture cooled. The stability of the composition at 47° C. (117° F.) were as follows (time to gellation);

No stabilizer—12 days
500 ppm of p,p'-dioctyl diphenylamine—56-58 days
1000 ppm of p,p'-dioctyl diphenylamine—81 days.

The example clearly illustrates the stability achieved by the amine stabilizer.

The above stabilized composition can be cured with free radical catalysts (peroxides) or UV-radiation to produce films exhibiting excellent physical properties.

EXAMPLE II

Into a three-liter flask equipped as in Example I were placed 1041 grams of Epoxy Resin B, 173.8 grams of glacial methacrylic acid, 182.2 grams of styrene, 0.46 grams of hydroquinone, and 5.2 grams of triphenylphosphine, and the mixture heated to 116° C. (240° F.) under $N_2$/air and held for 5 hours and thirty minutes. Then 803.9 grams of styrene was added and the temperature was lowered to 71° C. (160° F.) and 5.31 grams of maleic anhydride was added, held for 40 minutes and cooled.

The stability of the compositions at 47° C. (117° F.) are as follows:

| | |
|---|---|
| No stabilizer | 2–5 days |
| 250 ppm of p,p'-dioctyl diphenylamine | 44 days |
| 500 ppm of p,p'-dioctyl diphenylamine | 68 days |

EXAMPLE III

Into a three-liter flask equipped as in Example I were placed 1666 grams of Epoxy Resin A, 132 grams of Novolac Resin A and 1.34 grams of TMAC and the mixture heated at 171° C. (340° F.) for one hour under nitrogen. The WPE of the product was 246. The temperature was then covered to 116° C. (240° F.) and, under $N_2$/air sparge, were added 604 grams of glacial methacrylic acid, 4.7 grams of hydroquinone (25% in methanol), 217 grams of styrene and 10.4 grams of triphenylphosphine. After heating this mixture at 116° C. (240° F.) for two hours, the temperature was lowered to 104° C. (220° F.) and 53.7 grams of maleic anhydride was added and the temperature held at 104° C. (220° F.) for 20 minutes and 1135 grams of styrene was added. The stability of the compositions were as follows:

| Composition | Temp. | Days to Gellation |
|---|---|---|
| Composition w/o stabilizer | 47° C. | 21 |
| Component with 150 ppm of p,p'-dioctyl diphenylamine | 47° C. | 35 |
| Composition w/o stabilizer | 60° C. | 9–11 |
| Composition with 150 ppm of p,p-dioctyl diphenylamine | 60° C. | 19–21 |

These stabilized compositions cured with methyl ethyl ketone (MEK) peroxide to produce films of excellent properties.

EXAMPLE IV

The procedure of Example I is essentially repeated except that Saturated Resin A is used in lieu of Epoxy Resin A. Related results are achieved.

EXAMPLE V

The procedure of Example I was essentially repeated except that the amine was diphenylamine. Related stabilization was achieved.

What is claimed is:

1. A stabilized composition comprising (1) an ethylenically unsaturated polyester prepared by first esterifying an epoxy compound selected from the group consisting of glycidyl novolac resins glycidyl polyethers of polyhydric phenols and glycidyl polyethers of hydrogenated polyhydric phenols with an ethylenically unsaturated monocarboxylic acid in the presence of an organic phosphine esterification catalyst and then reacting the resulting vinyl ester with a polycarboxylic acid anhydride and (2) a stabilizing amount of a secondary amine of the general formula

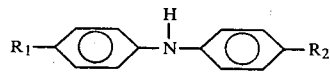

wherein $R_1$ and $R_2$ are each alkyl radicals of up to 12 carbon atoms or hydrogen.

2. The composition of claim 1 wherein the polyhydric phenol is 2,2-bis(4-hydroxyphenyl)propane.

3. The composition of claim 1 wherein the polyhydric phenol has been hydrogenated.

4. The composition of claim 1 wherein the polycarboxylic acid anhydride is maleic anhydride.

5. The composition of claim 1 wherein the secondary amine is p,p'-dioctyldiphenylamine.

6. A curable composition comprising (1) the composition of claim 1, (2) a compatible unsaturated comonomer and (3) a free-radical catalyst.

7. The composition of claim 6 wherein the comonomer is styrene.

* * * * *